(12) United States Patent
Groen et al.

(10) Patent No.: US 6,820,044 B2
(45) Date of Patent: Nov. 16, 2004

(54) METHOD AND APPARATUS FOR A COMMON-CAUSE FAILURE MODULE FOR PROBABILISTIC RISK ASSESSMENT TOOLS

(75) Inventors: Franciscus J. Groen, College Park, MD (US); Carol S. Smidts, Bethesda, MD (US); Ali Mosleh, Columbia, MD (US)

(73) Assignee: University of Maryland, College Park, MD (US)

( * ) Notice: Subject to any disclaimer, the term of this patent is extended or adjusted under 35 U.S.C. 154(b) by 456 days.

(21) Appl. No.: 09/971,765

(22) Filed: Oct. 9, 2001

(65) Prior Publication Data

US 2003/0070108 A1 Apr. 10, 2003

(51) Int. Cl.[7] .............................. G06N 7/00; G06F 17/10
(52) U.S. Cl. ................................. 703/2; 705/7; 706/48; 714/1
(58) Field of Search ............................... 703/1, 2, 6, 13, 703/17; 700/103; 705/7; 706/46, 47, 48; 714/1, 25, 26

(56) References Cited

U.S. PATENT DOCUMENTS 6,223,143 B1    4/2001   Weinstock et al. ............ 703/17

OTHER PUBLICATIONS

"NASA Commissions University for Space Shuttle Risk Analysis," Outlook, The University of Maryland at College Park, Faculty and Staff Weekly Newspaper, vol. 11, No. 27, Apr. 29, 1997, 1 page.
"Proposal : Development of Methodology and Integrated Software Platform for Space Shuttle Risk Assessment and Management," The University of Maryland, Jan. 10, 1997, 28 pages.
Mosleh, A. and Smidts, C., "Methodology and Software for Space Mission Risk Management," University of Maryland, Oct. 25, 1996, 39 pages.
International Search Report issued Dec. 10, 2002 for Appln. No PCT/US02/32090, 4 pages.
Stewardt, M., Probabilistic Risk Assessment of Quality Control and Quality Assurance Measures in Structural Design, IEEE Transactions on Systems, Man and Cybernetics, vol. 21, No. 5, Sep./Oct. 1991, pp. 1000–1007.
Kvam, P., A Parametric Mixture–Model for Common–Cause Failure Data, IEEE Transactions on Reliability, vol. 47, No. 1, Mar. 1998, pp. 30–34.
Chou, H.P. et al., Evaluation of Surveillance Test Interval from Risk Viewpoint, IEEE Transactions on Nuclear Science, vol. 45, Issue 3, Part 1, Jun. 1998, pp. 1009–1013.
Safie, F.M. et al., NASA New Approach for Evaluating Risk Reduction Due to Space Shuttle Upgrades, Reliability and Maintainability Symposium, Annual 2000, pp. 288–291.
Mulvihill, R.J. et al., Application of the NASA Risk Assessment Tool to the Evaluation of the Space Shuttle External Tank Re–welding Process, Reliability and Maintainability Symposium, Annual 2000, pp. 364–369.
Groen, F.J. et al., QRAS—The Quantitative Risk Assessment System, Reliability and Maintainability Symposium, Annual 2002, pp. 349–355.

Primary Examiner—Russell Frejd
(74) Attorney, Agent, or Firm—Sterne, Kessler, Goldstein & Fox P.L.L.C.

(57) ABSTRACT

A computer readable medium includes one or more sequences of one or more instructions for execution by one or more processors. The instructions when executed by the one or more processors cause the one or more processors to automatically insert common cause basic events into multiple tree structures in a risk model stored in a computer memory. The multiple tree structures are based on a single definition of the common cause failure group. The processors also replace regular basic events within the multiple structures with logigates including all common cause basic events associated with the common cause failure group.

26 Claims, 12 Drawing Sheets

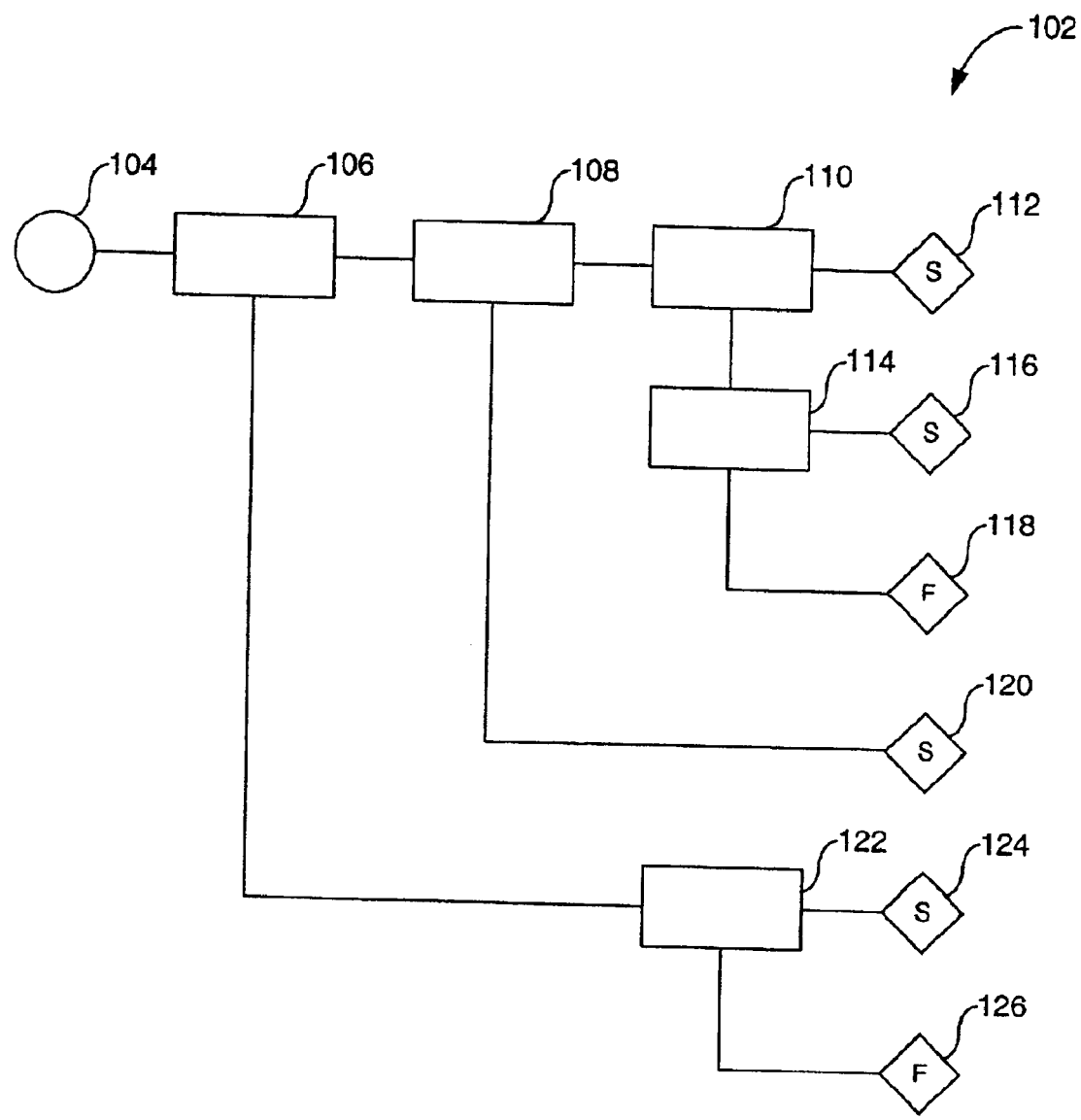
FIG. 1
(Conventional)

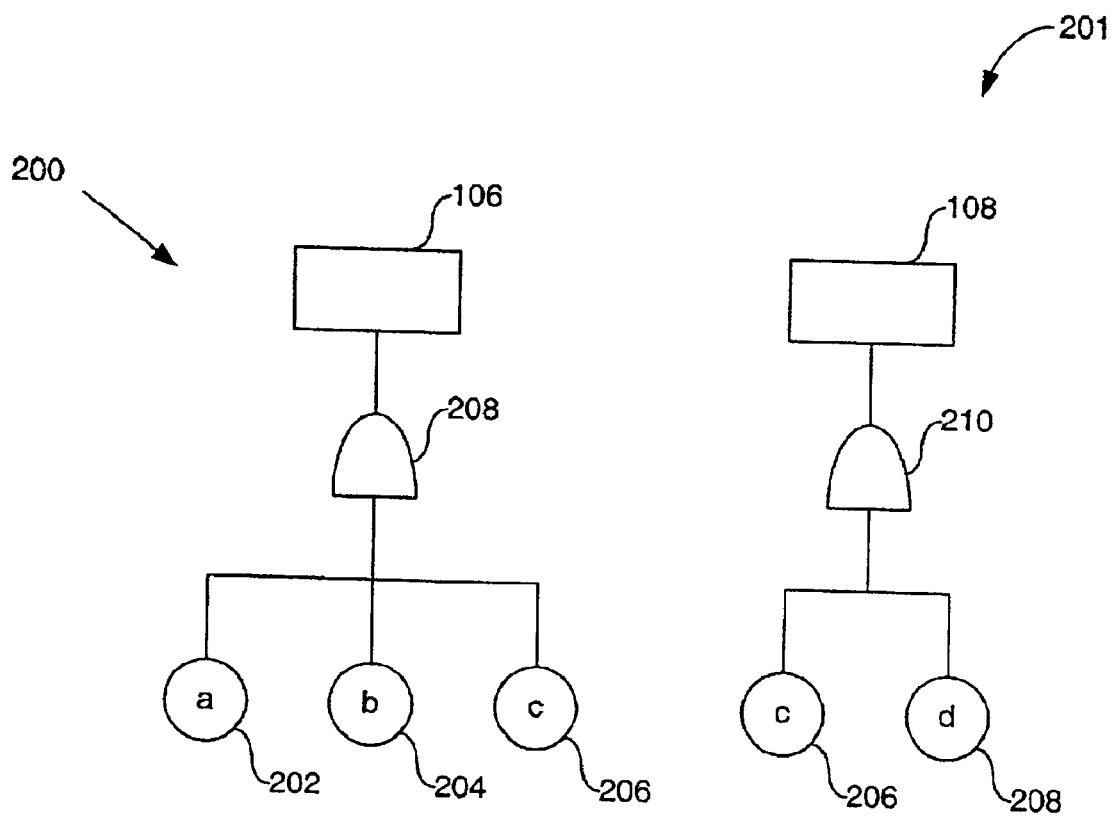
FIG. 2
(Conventional)

METHOD AND APPARATUS FOR A COMMON-CAUSE FAILURE MODULE FOR PROBABILISTIC RISK ASSESSMENT TOOLS

BACKGROUND OF THE INVENTION

1. Field of the Invention

The present invention generally relates to risk assessment tools used in risk modeling. More particularly, the present invention relates to the treatment of common cause failures in software tools for performing a probabilistic risk assessment (PRA).

2. Background Art

Common-cause failure is a known concept within the risk assessment community and is defined as the simultaneous, dependent failure of multiple components in a system due to a shared cause. Common-cause failure models typically address these dependent failures by introducing into the risk models events known as common-cause basic events, which represent the dependent failure of two or more components. The set of common-cause basic events to be introduced into the risk model is derived from a specification of common-cause failure groups created by a risk analyst. Common-cause failure groups are groups of components that the risk analyst considers to be subject to shared causes of failure.

One technique used in conventional risk modeling includes the use of PRA tools in which the risk model is scenario-based. Scenario-based modeling is accomplished using models known in the art as event sequence diagrams (ESDs). An ESD is a schematic representation of a sequence of events leading up to and contributing to a failure in the system being modeled. That is, the ESD is a flowchart with a number of paths showing an overall view of the failure and a combination of components or occurrences leading to the failure. An ESD typically consists of a number of interrelated events. A first of these events is called an initiating event which represents the occurrence of an event significant enough to trigger a catastrophic failure in the modeled system.

Also included in the ESDs are pivotal events, which are interim events whose occurrence or invocation may mitigate or aggravate the probability of occurrence of the initiating event. Finally, the ESD includes an end-state representative of a failure or success of the system due to the initiating event and the pivotal events. A complete ESD will include only one initiating event but may include many pivotal events and end states. The initiating event, the pivotal events, and the end-state are schematically related in a manner that will be discussed in greater detail below.

The pivotal events may be further defined and examined within structures known as fault trees. Each fault tree represents one pivotal event. A fault tree is a schematic representation of the events that contribute to the occurrence of the pivotal event. Thus, an entire ESD may be expressed in terms of a number of different interrelated fault trees, each representing subcombinations of events that contribute to the corresponding pivotal event. The events that form the fault trees are low level events known as basic events. The makeup and structure of the fault trees will also be discussed in greater detail below.

Typically, the basic events, which form the fault tree, may be modeled as independent events, meaning that the occurrence or nonoccurrence of each of the events in the ESD is assumed to be unaffected by the occurrence or nonoccurrence of the other basic events. In general, common-cause failure modeling is concerned with situations where multiple basic events are considered to occur due to a single cause. As stated above, a group of basic events considered to be susceptible to a common-cause failure is known as a common-cause group.

Existing failure models are structured to include and analyze ESDs and fault trees. However, the existing failure models are unable to accurately determine the probability that a common-group will contribute to a system failure. Also, the existing models are unable to efficiently quantify the extent to which the probability of the common cause group can be distributed to the common cause basic events within the group.

In terms of common-cause failures, for example, traditional failure models are able to determine the significance of an independent basic event within the ESD. The process of determining whether regular basic events (independent) may also be members of a much more complex common-cause group is a time-consuming task and therefore more difficult. This process is typically manually accomplished by the individual risk analyst. In these failure models, although it is known that an individual basic event may also be a common-cause event, the model is unable to automatically determine and quantify the extent to which the basic event will likely contribute to the failure of the system under test.

What is needed therefore is a common-cause failure module that is designed with an inherent awareness of the rules for constructing and quantifying common-cause groups and common-cause basic events, and then use these rules to aid the risk analyst in correctly and efficiently introducing these common-cause failures into the risk models.

BRIEF SUMMARY OF THE INVENTION

According to an aspect of the invention, a common-cause failure module is provided which automates the insertion of common-cause basic events into multiple fault-tree structures. In case a regular basic event is found to be a member of a common-cause group, that basic event is automatically replaced by a logical operation that has two or more of the appropriate common-cause basic events associated with the common-cause group. Whenever an uncertainty analysis of the risk model is performed, the common-cause failure module correctly samples the probabilities for the common-cause basic events, such that dependencies and their probabilities are appropriately accounted for within the model.

Consistent with the principles of the present invention as embodied and broadly described herein, the invention includes a computer-readable medium carrying one or more sequences of one or more instructions for execution by one or more processors. The instructions, when executed by the one or more processors, cause the one or more processors to perform the step of automatically inserting common-cause basic events into multiple tree structures in a risk model stored in a computer memory. The processors also perform the step of replacing regular basic events within the multiple tree structures with logic gates including two or more common-cause basic events associated with the common-cause failure group. The logic gates are based on a single definition of a common cause failure group.

In another embodiment, the invention is directed to a method for enabling a user to identify common-cause failure groups within a software risk model stored on a machine-readable computer memory. The method comprises the steps of permitting a user to display a list of existing common-cause failure groups associated with the risk model via a graphical user interface and permitting the user to modify the list using the graphical user interface.

In yet another embodiment, the invention is directed to a system including a processor and a memory comprising a first database stored in the memory, including data representative of a system risk model. The risk model includes at least one event system diagram and a number of fault tree definitions corresponding to the event system diagram. The fault tree definitions are adapted to model an influence of system component failures upon the system. Each fault tree relationship is formed of a number of inter-related basic events. The system also includes a common-cause group defining mechanism configured to permit a user to define a common-cause group in accordance with a number of inter-related basic events. The common-cause group defining mechanism includes one or more graphical user interfaces configured to display defined common-cause groups and permit the user to load the defined common-cause groups into the first database. The common-cause groups are defined in terms of common-cause basic events, each corresponding to a regular basic event. Also included in the system are a fault tree data structure mechanism and a common-cause failure expansion mechanism.

The fault-tree data structure mechanism is configured to define a fault-tree data structure stored in the memory and adapted to convey an interdependence between the fault-tree definitions to form fault trees. The common-cause failure expansion mechanism is configured to apply common-cause failure expansion rules stored in the memory and adapted to convey a union of the regular basic events and the common-cause basic events. The processor is configured to apply the common-cause failure expansion rules to the fault trees to produce an expanded data structure representative of an occurrence of the common-cause basic events. Finally, the expanded data structure is displayed to the user via the one or more graphical user interfaces.

Features and advantages of the invention include a risk module capable of aiding a risk analyst to recognize the probabilities associated with common-cause groups and common-cause basic events and their impact on the operation of the modeled system. Such a module can be implemented using a number of different approaches and will provide the analyst with a technique that is more accurate, more efficient, and faster in understanding the probabilities associated with failure events.

BRIEF DESCRIPTION OF THE DRAWINGS

The accompanying drawings, which are incorporated herein and constitute a part of the specification, illustrate an embodiment of the invention and, together with the description, explain the purpose, advantages, and principles of the invention. In the drawings:

FIG. 1 is a conventional event sequence diagram used in a risk model;

FIG. 2 illustrates conventional fault trees associated with the event sequence diagram of FIG. 1;

DETAILED DESCRIPTION OF THE INVENTION

Figure 3:
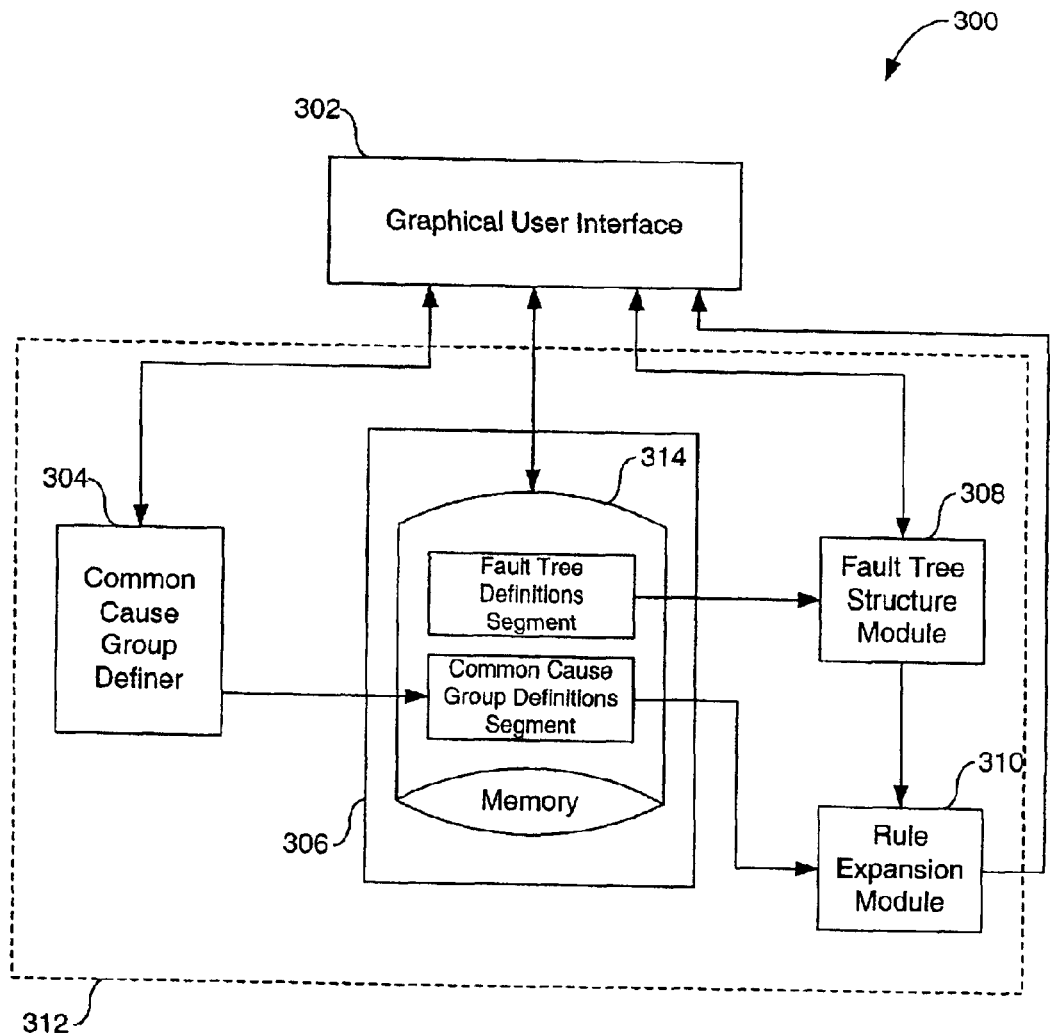
FIG. 3 is a block diagram representation of an exemplary system constructed and arranged in accordance with the present invention.

The following detailed description of the present invention refers to the accompanying drawings that illustrate exemplary embodiments consistent with the invention. Other inventions are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware, and/or the entities illustrated in the figures. Any actual software code with specialized, controlled hardware to implement the present invention is not limiting of the present invention. Thus, the operation and behavior of the present invention will be described with the understanding that modifications and variations of the embodiments are possible, given the level of detail presented herein.

Referring to the figures, FIG. 1 shows a traditional event sequence diagram (ESD) 102. In FIG. 1, the ESD 102 includes an initiating event 104. As stated above, an initiating event can be any event that creates a catastrophic failure or a significantly undesirable outcome in the system being modeled. The initiating event could be human-oriented, hardware-oriented, or could be introduced into the system through some external event. A meteor strike in an orbiting space shuttle, for example, can represent an initiating event.

The initiating event 104 is serially connected to pivotal events 106, 108, and 110. The pivotal events are events that determine how and the extent to which the initiating event produces a desirable or undesirable end-state 112 in the system. End-states, such as the end-state 112, are defined by the risk analyst and are a measure of whether the pivotal events were mitigating factors or aggregating factors in the propagation of the initiating event 104 through the system. Each ESD includes one initiating event schematically connected to a number of pivotal events and end states.

The initiating event 104 can represent a meteor strike and subsequent on-board fire. In the example of FIG. 1, the pivotal event 106 can represent whether an air crew member recognized that fragments from the meteor strike created a breach in the Shuttle's hull. The pivotal event 108 can represent whether the air crew member activated the proper procedures to respond to the breach. Finally, the pivotal event 110 might represent whether the fire was extinguished. The end-state 112 represents a satisfactory end result. The pivotal event 114 can represent, for example, whether the depressurizing system was used. The end-state 116 would represent a satisfactory conclusion to the pivotal event 114. An end-state 118 can represent a catastrophic failure of the space shuttle if the depressurizing system did not work properly.

During operation, the analyst interprets the event sequence diagram 102 in the following manner: when the initiating event 104 occurs, then the pivotal events 106, 108 and 110, must also each occur. If they do occur, the successful end-state 112 is the result. If, however, the vents 106 and 108 occur but the event 110 does not occur and the pivotal event 114 occurs, then the successful end-state 116 will occur. If the pivotal event 114 did not occur, the failure would result. If the pivotal event 116 occurred but the pivotal event 108 did not occur, then a successful end-state 120 would occur. Finally, a pivotal event 122 can represent some other user interaction required only if the pivotal event 106 did not occur. If the pivotal event 122 occurred, the successful end-state 124 will occur. On the other hand, if the pivotal event 122 did not occur, a failure end-state 126 would occur.

The pivotal events of an ESD may be expressed in terms of a fault tree, such as the fault trees shown in FIG. 2. A fault tree is a decision tree that is limited to binary outcomes for each of the pivotal events associated with an ESD. More specifically, FIG. 2 shows fault trees 200 and 201, which respectively correspond to the exemplary pivotal events 106 and 108 from the ESD 102. The fault tree is representative of a deductive reasoning process that determines what must happen in order for the pivotal event to occur. Traditional fault trees include a top event that represents occurrence of the corresponding pivotal event. A fault tree also includes a number of basic events that logically combine to spawn the occurrence of the top event.

The basic events represent the lowest level of occurrence in the system that may contribute to the occurrence of their corresponding pivotal event. Fault trees use logical gates such as AND gates and/or OR gates to represent the relationships between the basic events and the top event within the fault tree. Within the scope of a risk model, basic events cannot be broken down into smaller contributing events. Additionally, each basic event possesses its own unique probability of occurrence that is independent from the occurrence of all of the other basic events. Thus, if the fault trees are properly constructed and analyzed, they will provide the risk analyst with an estimate of the likelihood of an occurrence of the top event of the fault tree based upon a probability of occurrence associated with the individual basic events.

In FIG. 2, for example, the fault tree's top event and the pivotal event 106 will occur if the basic events 202, 204, and 206, each occurs, as shown by presence of an AND gate 208 connecting the basic events to the pivotal event 106. Similarly, the fault tree 201 shows that if basic events 206 and 208 occur, as represented by an AND gate 210, then the pivotal event 108 will also occur.

It is also shown in FIG. 2 that the basic event 206 appears in each of the fault trees 200 and 201. The basic event 206 is therefore a common cause basic event. Thus, in FIG. 2, both of the pivotal events 106 and 108 depend on the occurrence of the basic event 206. That is, if the basic event 206 occurs in connection with the pivotal event 106, then it will already be present when the pivotal event 108 occurs. This relationship is referred to as a dependency between the occurrence of the pivotal events 106 and 108. Although the dependency between the pivotal events 106 and 108 can easily be recognized in the fault trees 200 and 201 of FIG. 2, most fault trees usually contain hundreds or thousands of basic events that must be manually identified in conventional PRA models. Therefore, the conventional PRA models sincerely limit the risk analyst's ability to quickly recognize the dependencies created by the common cause basic events. In the present invention however, the dependencies and common cause basic events can be automatically recognized, thereby aiding the risk analyst in correctly and efficiently introducing the impact of common cause failures into the risk models.

FIG. 3 shows an exemplary common cause failure module 300 constructed and arranged in accordance with the present invention. In FIG. 3, the common cause failure module 300 includes a graphical user interface 302, a common cause group definer 304, a main computer 306, a fault tree structure module 308, a rule expansion module 310, and a system computer 312. Also included is a computer memory 314. The graphical user interface 302 can be implemented using any conventional display means, such as a computer monitor along with a keyboard or mouse, a touch screen display, or any other suitable alternative.

The fault tree structure module 308 and the rule expansion module 310 are implemented in software in the present invention, although they could be implemented in hardware, firmware or any combination thereof. As stated above, the common cause failure module 300 assists the risk analyst in identifying common cause failures and determining the probability and the extent to which these common cause failures impact the occurrence of system components. The common cause group definer 304 is used by the risk analyst to identify and quantify common cause groups such as the exemplary common cause group 400, shown in FIG. 4.

Figure 4:
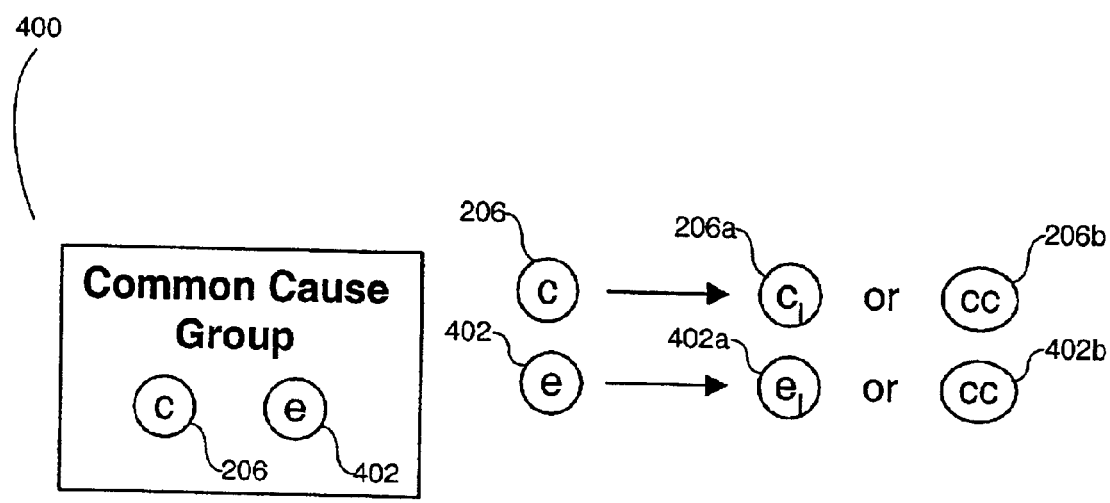
FIG. 4 is an illustration of a hypothetical common-cause group based upon the fault trees shown in FIG. 2.
Figure 5:
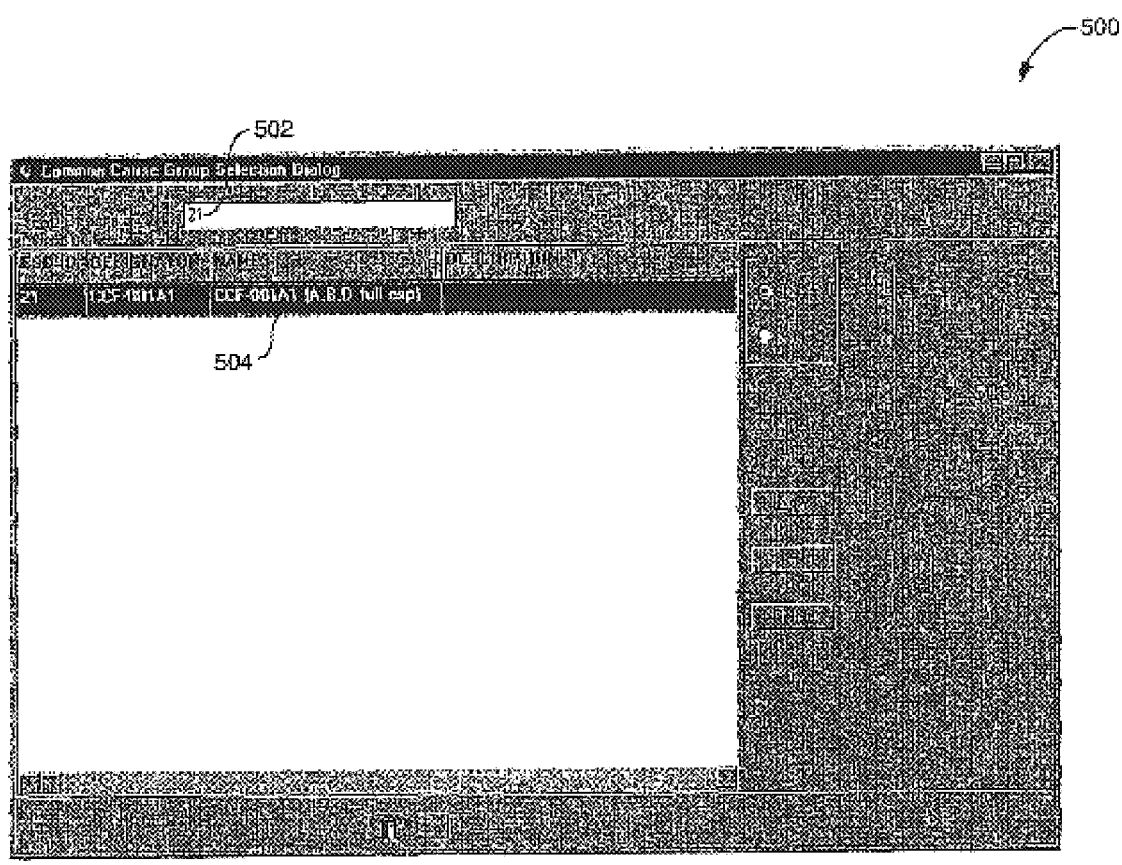
FIG. 5 is an exemplary graphical representation of a risk analyst tool for defining a common-cause failure group.

FIG. 4 shows the exemplary common cause group 400 that can result from fault tree dependencies, such as the dependency between the fault trees 200 and 201 shown in FIG. 2. In FIG. 4, the common cause group 400 includes the common cause basic event 206 from the fault trees 200 and 201. For purposes of illustration, an additional common cause basic event 402 can be included that may correspond to any of the other pivotal events 110, 114, and/or 122 of the ESD 102. FIG. 4 shows that the basic event 206 can occur in the fault trees 200 independently, as a regular basic event 206a, or dependently, as a common cause basic event 206b. Similarly, the basic event 402 can appear in its corresponding fault trees as an independent regular basic event 402a or dependently, as a common cause basic event 402b. In order to properly recognize the common cause group 400 using the present invention, a risk analyst will be presented with a number of graphical presentations via the graphical user interface 302, such as the screenshot shown in FIG. 5.

Such a need can arise when the analyst needs to edit existing common cause groups or create new common cause groups due to changes in the operation of the components that combine to form the system being modeled. Additionally, the risk analyst might need to reorder the position of pivotal events within the ESD to reduce the impact of a failure likely to result from a catastrophic initiating event. Each of these scenarios presents the risk analyst with a need to efficiently and quickly edit existing common cause groups or create new common cause groups within the risk model. Since previous versions of an analyst's model will likely include regular basic events, common cause basic events, and common cause groups, the first step the risk analyst must undertake to identify the common cause groups that already exist.

The screenshot 500 is provided to show the user all existing common cause groups within the risk model. Since the regular basic events and the common cause basic events are all associated with a particular ESD, the screenshot 500 presents the user with a particular ESD designator ID 502, identifying the associated ESD. Here, the designator ID corresponds to an identified common cause failure group 504 as shown. The user can also be presented with a number of options 506 pertaining to use of the screenshot 500, such as a common cause group filter. The user scrolls the exemplary screen 500 to find the existing common cause groups. The user is presented with additional screen shots after completing entries in the screen 500 to complete the process of defining new common cause groups.

Figure 6:
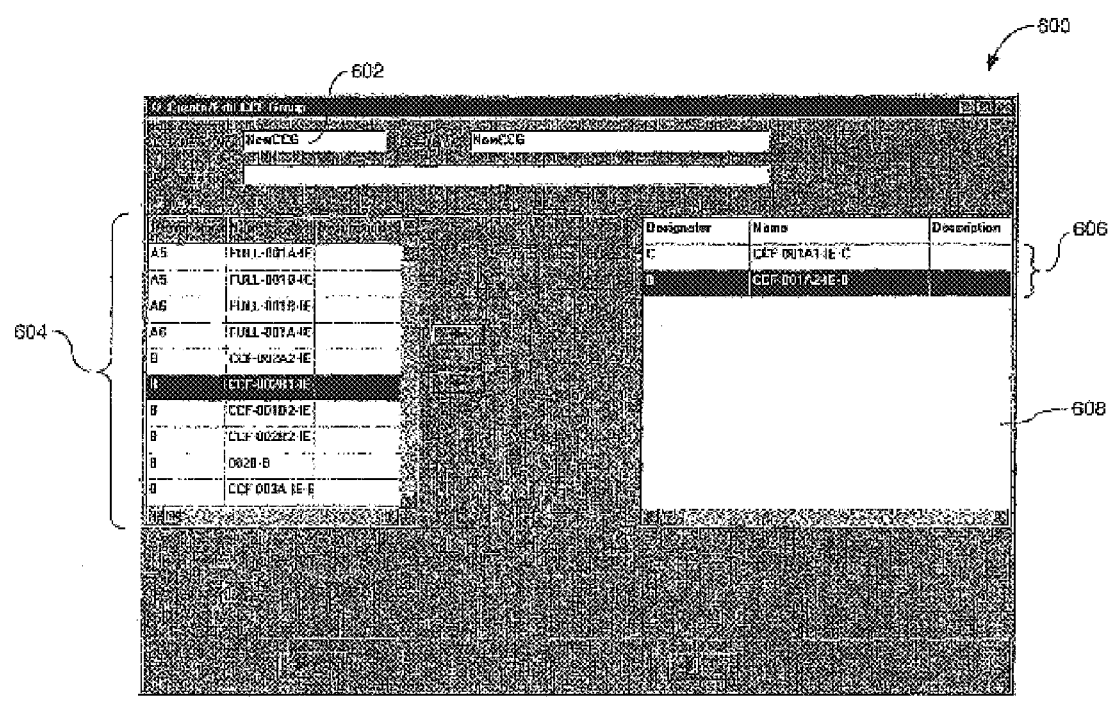
FIG. 6 is an exemplary graphical representation of a risk analyst tool for defining common-cause basic events in accordance with the representation of FIG. 5.

Another exemplary screen, such as the screenshot 600, shown in FIG. 6 includes a reference to the common cause group created or edited in the analyst's previous session using the screenshot 500. For example, a designator 602 in the exemplary screen 600 associates the screen with the common cause group created in the screen 500. The screen 600 is also known as a common cause group instance. Here, the analyst is presented with a global list 604 of all of the basic events in the corresponding ESD. As discussed above, the risk analyst may desire to edit existing common cause groups or create new ones.

Thus, from within the global list 604 the risk analyst can select those basic events which are believed to be members of a common cause group and which the analyst desires to determine specific probabilities associated therewith. As shown, for example, the analyst can select a group of basic events 606 to examine as a common cause group. Using the present invention, the analyst chooses the basic events 606 (events C and B) from the global list 604 and inserts those events into a member list 608 of common cause basic events.

Each basic event must be a member event of at most one screen shot associated with a particular ESD to preclude ambiguous expansions. Expansions will be discussed in greater detail below. Having now defined the common cause group 606, the user can now determine the different probabilities associated with the group, as well as those associated with the individual events C and B. More specifically, the risk analyst can now determine the likelihood that the basic events C and B of the common cause group 606 will contribute to a failure as independent regular basic events or dependently, as common cause basic events.

In practice, the common cause group can be any suitable data structure configured for storage in a computer memory, such as the memory 314 of the main computer 306.

When a system under test is initially modeled, the associations that form the fault trees can also be stored in the memory 314. These fault tree definitions can include, for example, a definition of the top event in the fault tree and the identification of all the associated basic events. The fault tree definitions are stored in the memory 316 when the risk model is initially created.

With the common cause group definitions defined and stored in the memory 314, the risk analyst can now select a common cause expansion model to apply the common cause group. The expansion model specifies rules for expanding regular basic events into common cause basic events and rules for quantifying the common cause basic events. The risk analyst also may use the model to describe the uncertainty about the total probability associated with the common cause group. The expansion is then used to update the corresponding fault tree. Traditional models include the Alpha Factor and Beta Factor models, although others may be used. The expanded fault tree structure illustrates how probabilities associated with the common cause basic events relate to the associated pivotal events. Selection of the expansion model is accomplished using, for example, the exemplary screenshot 700, of FIG. 7.

Figure 7:
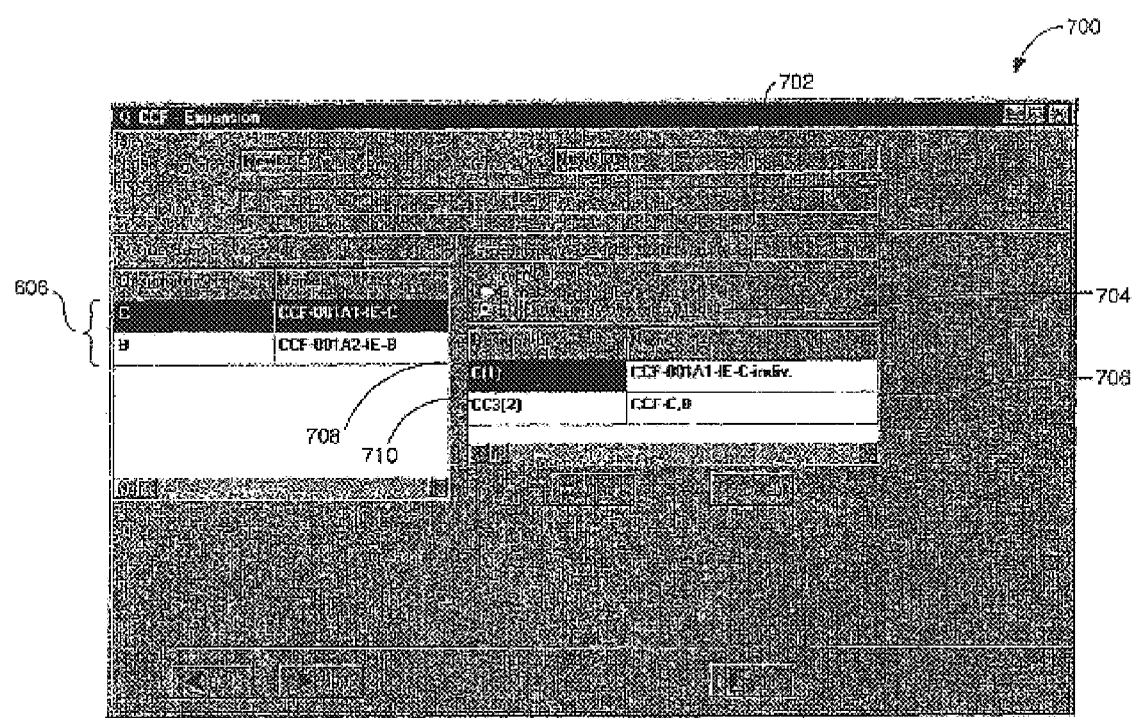
FIG. 7 is an exemplary graphical representation of a risk analyst tool for selection of an expansion model associated with the analyst tool of FIG. 6.

In FIG. 7, a window is shown on one side of the screenshot 700 and the available risk models are shown in another window. The particular risk model to be applied may be chosen from a number of conventional expansion models such as the global expansion (Beta Factor model) 702 and the full expansion (Alpha Factor model) 704.

For purposes of illustration, the common cause basic event C of the common cause group 606 will be chosen as well as the exemplary full expansion model 704 from the screen 700. With the full expansion model 704 selected, the Alpha Factor rules, will be applied during the expansion process. An exemplary preview of a visualization of the expansion is shown in the screen area 706 of the exemplary screenshot 700.

Here, the basic event C of the common cause group 606 is shown to be a regular basic event C(1). The event C is also shown as a common cause basic event CC3(2). That is, the basic event C may contribute to a system failure as a regular basic event or as a common cause basic event CC3(2). Thus, the window 706 gives the risk analyst a preview of the expansion of the common cause group that includes the basic event C. Next, the risk analyst must determine the probability of occurrence associated with the expanded common cause group.

Referring back to FIG. 3, when the fault tree definitions have been completed, they are loaded into the fault tree structure module 308 to complete the construction of the fault tree. The module 308 associates the stored definitions with a data structure suitable for presentation via the graphical user interface 302. The completed fault tree is then loaded into the rule expansion module 310.

Similarly, when the common cause group definitions have been completed, the completed definitions are also loaded into the rule expansion module 310. The received fault tree is then defined and expanded in accordance with the received common cause group definitions and the selected expansion rules. The output of the rule expansion module is therefore a completed fault tree structure showing not only the associated regular basic events, but also the common cause basic events that create the dependencies between different fault trees. The final expanded tree is then presented to the user via a graphical representation that can be more carefully examined and analyzed. In practice, the fault tree structure module 308 and the rule expansion module 310 can be a dedicated computer processor, although the present invention is not limited to such an implementation.

The risk analyst can now quantify the uncertainty about the total probability of the selected common cause group. An exemplary screenshot, such as a screenshot 800, is presented to the user as a first step in this process. Specifically, in an exemplary embodiment of the common cause failure module, the analyst is permitted, via the exemplary screenshot 800, to determine the total probability of occurrence of the common cause failure group. However, since uncertainty surrounds determination of any probability assessment, the total probability of the common cause basic event may be more accurately expressed in terms of the uncertainty about the total probability.

The exemplary screenshot 800, permits the risk analyst to express the uncertainty about the total probability of the common cause failure group. The total probability ($Q_T$) may be graphically represented by a number of standard distribution curves, such as a beta, gamma, or other suitable distribution curves. Stated another way, when the fault tree is constructed containing the regular basic event C(1) and the common cause basic CC3(2) as shown in FIG. 7, the user may apply the expansion model rules to quantify $Q_T$. In so doing, the user can more accurately determine the uncertainty that the regular basic event C(1) and the common cause basic event CC3(2) will contribute to a system failure.

Concerning probabilities associated with regular basic events in general, risk modelers, through experimentation and analysis, have developed uncertainty factors that may be associated with the components of any system within the risk model. That is, the uncertainty factors are already known and may be simply entered into the common cause failure module by the risk analyst in order to plot the uncertainty about $Q_T$.

Figure 8:
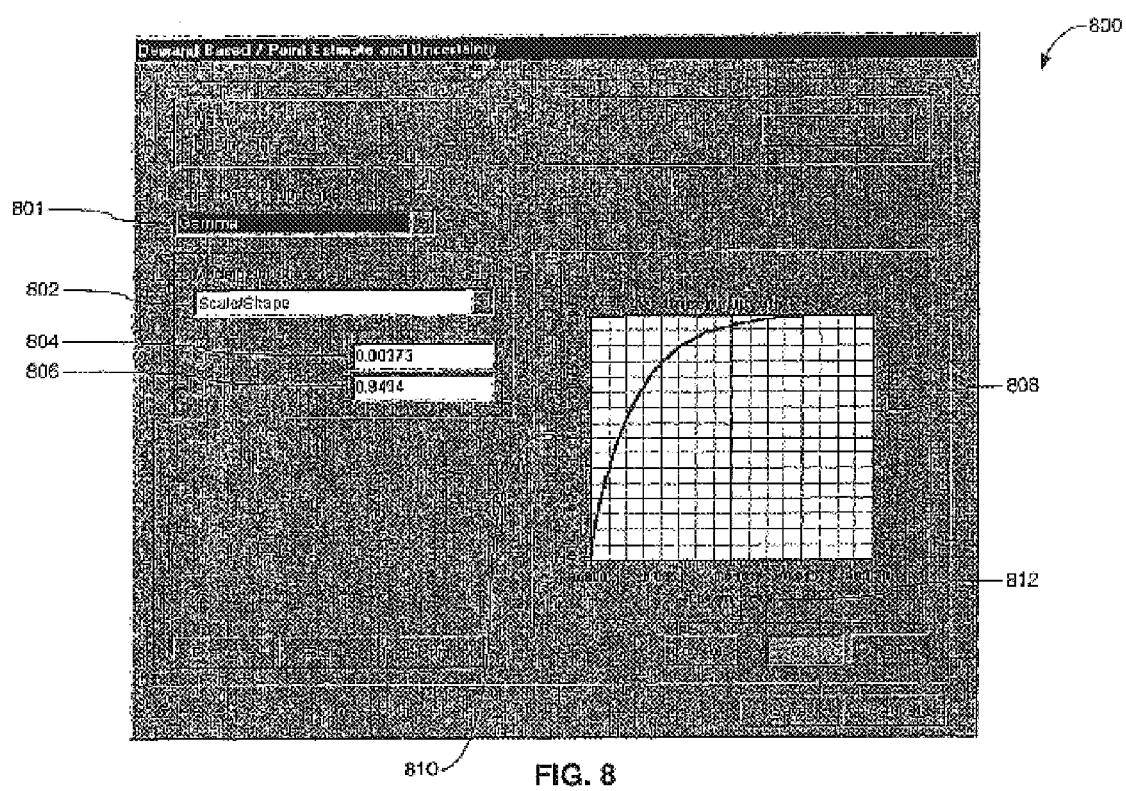
FIG. 8 is an exemplary embodiment of a risk analyst tool applying an uncertainty probability analysis.

Each of the basic events shown in the global list 604 of FIG. 6, as a regular basic event, is associated with a static probability of occurrence determined through experimentation, derivation, and analysis as discussed above. Using the screenshot 800 of FIG. 8, the risk analyst can express $Q_T$ in terms of a preferred distribution curve such as the gamma curve. In FIG. 8, a graph 808 is a gamma distribution plot and is used to illustrate the uncertainty surrounding $Q_T$ of the regular basic events without any association with the common cause groups. This is accomplished with the risk analyst specifying parameters required in the screen 800, such as the distribution for the total probability 801, a mode of input 802, a specific scale factor 804, and a shape 806. Thus, $Q_T$ without any association with common cause factors is expressed in the graph 808 of the screenshot 800.

More specifically, an analyst can determine that if starting with $Q_T$ of an event as a regular basic event using parameters 810 and 812, then these parameters and additional parameters may be taken together to further determine the total probability of the same events as members of a common cause group. Thus, as stated above, the user may select a distribution for $Q_T$ from among the available techniques Each technique is a mathematical function expressed in terms of parameters that can be selected by the analyst.

In the graph 808, the user specifies parameters 810 along the vertical access and parameters 812 along the horizontal access of the plot. The parameters 810 may be specified, for example, in terms of a cumulative density function (CDF) or probability density function (PDF), etc. Thus the uncertainty plot 808 for $Q_T$ can be interpreted as indicating that there is a 50% chance that the actual value of the probability of the common cause group containing the basic events C(1) and CC3(2) is smaller than about 0.0015. Similarly, as can also be observed from the graph 808, there is about a 75% chance that the value of this probability will be smaller than about 0.004.

Next, with the risk analyst having determined that the uncertainty about $Q_T$ for the common cause group, a determination must now be made as to how $Q_T$ can be distributed across the individual members of the common cause group, the regular basic event C(1) and the common cause basic event CC3(2). The extension of $Q_T$ to the common cause group can be extended to the probability for the individual basic events using, for example, a Beta Factor model and using the following expression:

$$Q_I = (1-\beta)^* Q_T; \text{ and} \quad (1)$$

$$Q_{CC} = \beta^* Q_T \quad (2)$$

Where $Q_I$ is the probability of common cause basic events representing independent failures, and $Q_{CC}$ is the probability of the common cause basic events representing dependent failures, the analyst specifies the uncertainty about $Q_I$ and $Q_{CC}$ in terms of uncertainty distributions about $Q_{CC}$ and $\beta$. The above equations define a correlation between $Q_I$ and $Q_{CC}$ for the Beta Factor model.

Figure 9:
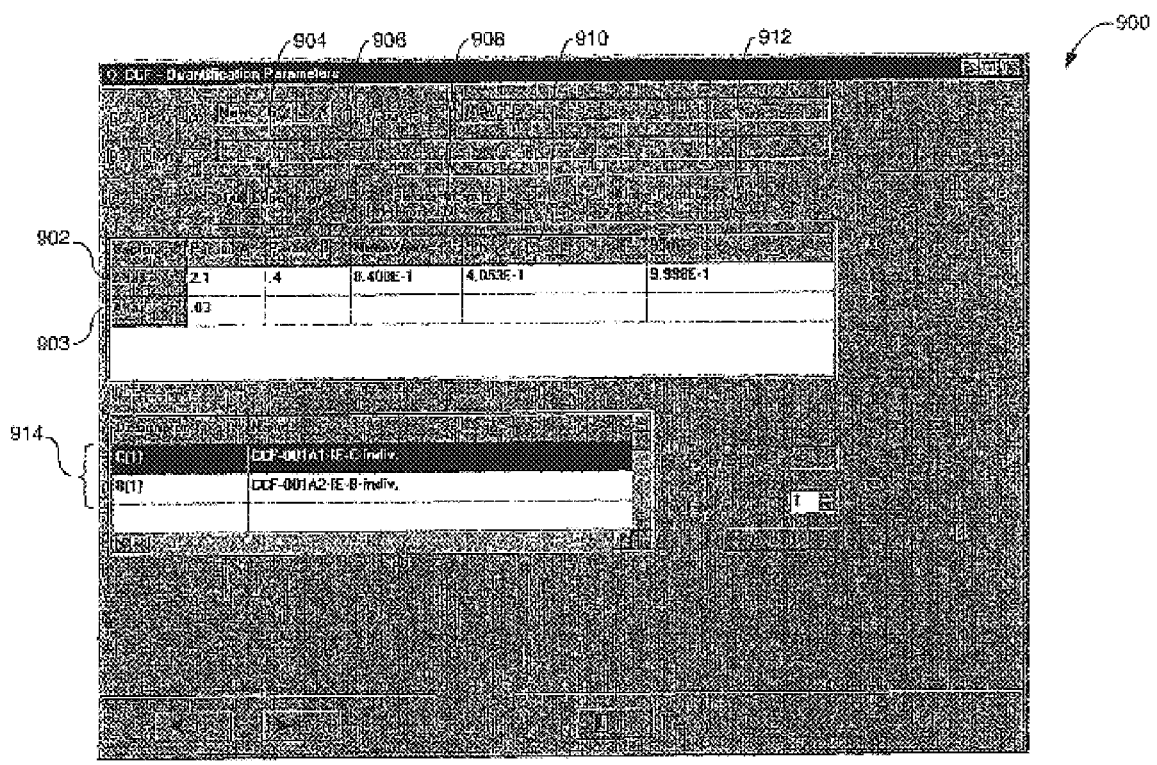
FIG. 9 is an exemplary representation of a risk analyst tool permitting a user to enter parameters associated with basic event probability determinations.

FIG. 9 presents an exemplary screenshot 900 providing the risk analyst with a tool which provides the capability to enter all of the parameters associated with the expansion model. In FIG. 9, the screenshot 100 includes a full expansion, as specified by the full expansion using, by way of illustration, the Alpha Factor model 704 shown in FIG. 7. By expanding the common cause group, including the regular basic event C(1) and the common cause basic event CC3(2), in terms of a full expansion, the Alpha Factor model is applied in order to distribute the total probability across each of the basic events. Here, the risk analyst selects a first alpha factor 902 and a second alpha factor 903 for use as initial values associated with the model. The alpha factors 902 and 903 are analogous to the value $\beta$ used in equations one and two above and applicable to the Beta Factor model. Here, however, since the risk analyst has chosen the full expansion in accordance with the Alpha Factor model 704, alpha factors must be selected instead of beta factors. Thus, using the Alpha Factor model, the risk analyst must specify one or more alpha factor parameters in order to distribute the total probability $Q_T$ of the common cause group across the basic events C(1) and CC3(2).

The values for the alpha factor 902 and the alpha factor 903 are also chosen in uncertain terms as are the values for $\beta$ and $Q_T$ from equations (1) and (2) above. Since the exact value for the alpha factor 902 and the alpha factor 903 are not precisely known, they must be specified or selected in terms of uncertainty. As noted above, the uncertainty on the total probability $Q_T$ was expressed in the plot 808 in terms of a gamma distribution. A gamma, log normal, or other type distribution could be used for the screen 900. However, the inventors of the present invention have chosen to express the uncertainty as determined by the Alpha Factor model, in terms of a beta distribution. The selected alpha 1 factor 902 and the alpha 2 factor 903 parameters determine the way in which $Q_T$ will be distributed about the common cause basic events. Next, a parameter A (904) and a parameter B (906) must be chosen by the analyst for each of the alpha factors 902 and 903 in accordance with the selected beta distribution.

Parameters A (904) and B (906) can be selected based upon experimentation analysis and a general knowledge of the probability that certain components of the system under test may or may not fail. Also, as known in the art, parameters A (904) and B (906) may be selected based upon defined default values that are conventionally characteristic of beta distributions. Here, for purposes of illustration, the values for parameters A and B have been chosen as 2.1 and 0.4 respectively which in turn are used to specify the uncertainty about alpha factor 1 for applying a beta distribution. The parameters A (904) and B (906) in the exemplary screen 900 are analogous to the parameters 804 and 806 associated with the exemplary screen 800 in FIG. 8, in that they are selected by the risk analyst and are chosen based upon archived experimental and/or analytical data. Similarly, for the alpha 2 factor 903 in the exemplary screen 900, parameter A has been chosen to be 0.03.

Therefore, what is implied by the risk analyst selecting the noted values for the alpha factors 902 and 903 and the parameters A (904) and B (906) is a best estimate by the analyst. The estimate suggests that based upon all of the selected parameters, the mean value associated with the beta distribution is about $8.4 \times 10^{-1}$ with the $5^{th}$ percentile being about $4.05 \times 10^{-1}$ and the $95^{th}$ percentile being about $9.9 \times 10^{-1}$. The $5^{th}$ percentile can be viewed as a lower bound estimate while the $95^{th}$ percentile can be viewed as an upper bound estimate for alpha 1 factor 902. If the risk analysts were to change the parameter A (904) and/or parameter B (906) for alpha 1, the mean value, the $5^{th}$ percentile, and the $95^{th}$ percentile values 908, 910 and 912, would all change.

As discussed above, the particular values for parameters A and B may be chosen through extensive life cycle testing regarding failures of system components, experimentation, and hypotheticals regarding mean time between failure associated with system components. In the present invention, however, the risk analyst chooses these values.

For example, in the case of the space shuttle, the noted parameter values can be derived from tables which result from an analysis to determine how likely is it that if any of the engines failed or any of the power supply systems failed, it will trigger the failure of other engines or other power supply systems. The exemplary screen 900 merely conveys an interdependence of the various probabilities as distributed between regular basic events and common cause basic events associated with particular fault trees. A window 914 in the exemplary screen 900 is used by the analyst to specify the desired number of events to be included in the analysis, the number of simultaneous events or any other factors or variations that may be desirable in terms of performing a common cause probability analysis.

Again, referring back to FIG. 3, now that the risk analyst has entered all of the appropriate data into the expansion models, the rule expansion module 310 can apply this data to expand the fault tree to present a visualization to the risk analyst via the graphical user interface 302.

Figure 10:
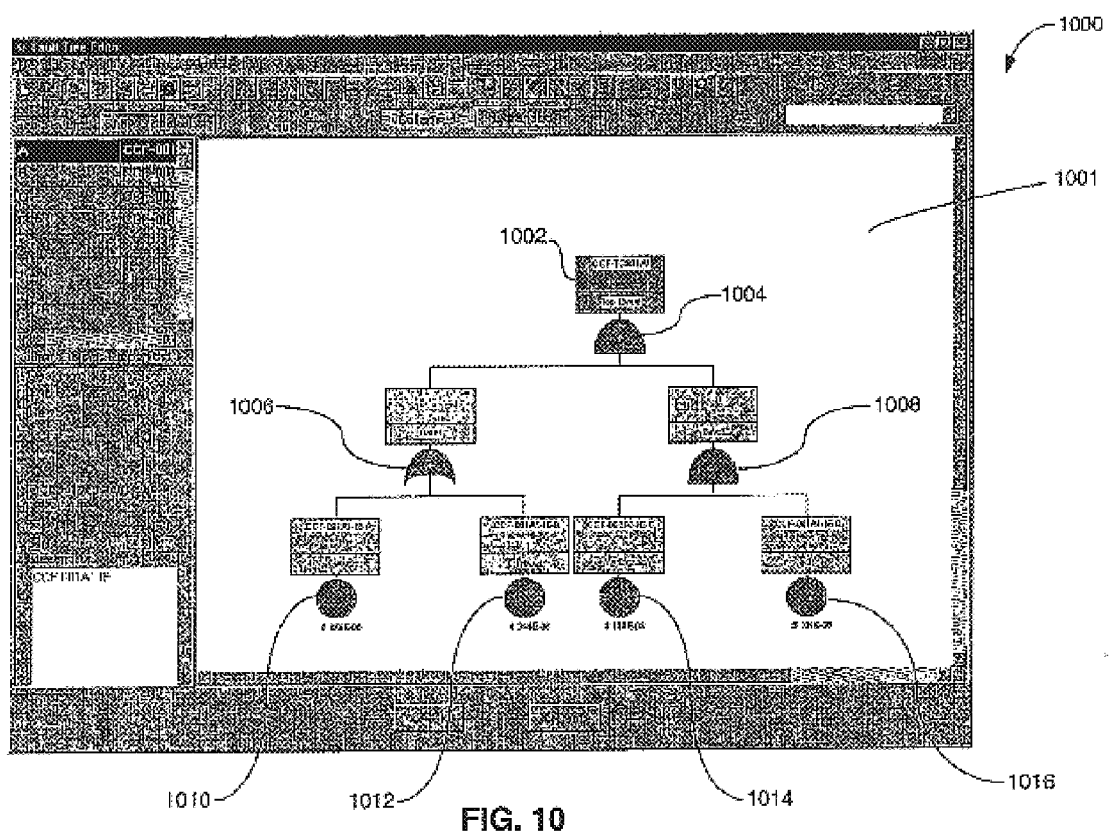
FIG. 10 is an exemplary graphical representation of a fault tree including a top event and a number of regular basic events logically connected to form and produce the top event.
Figure 11:
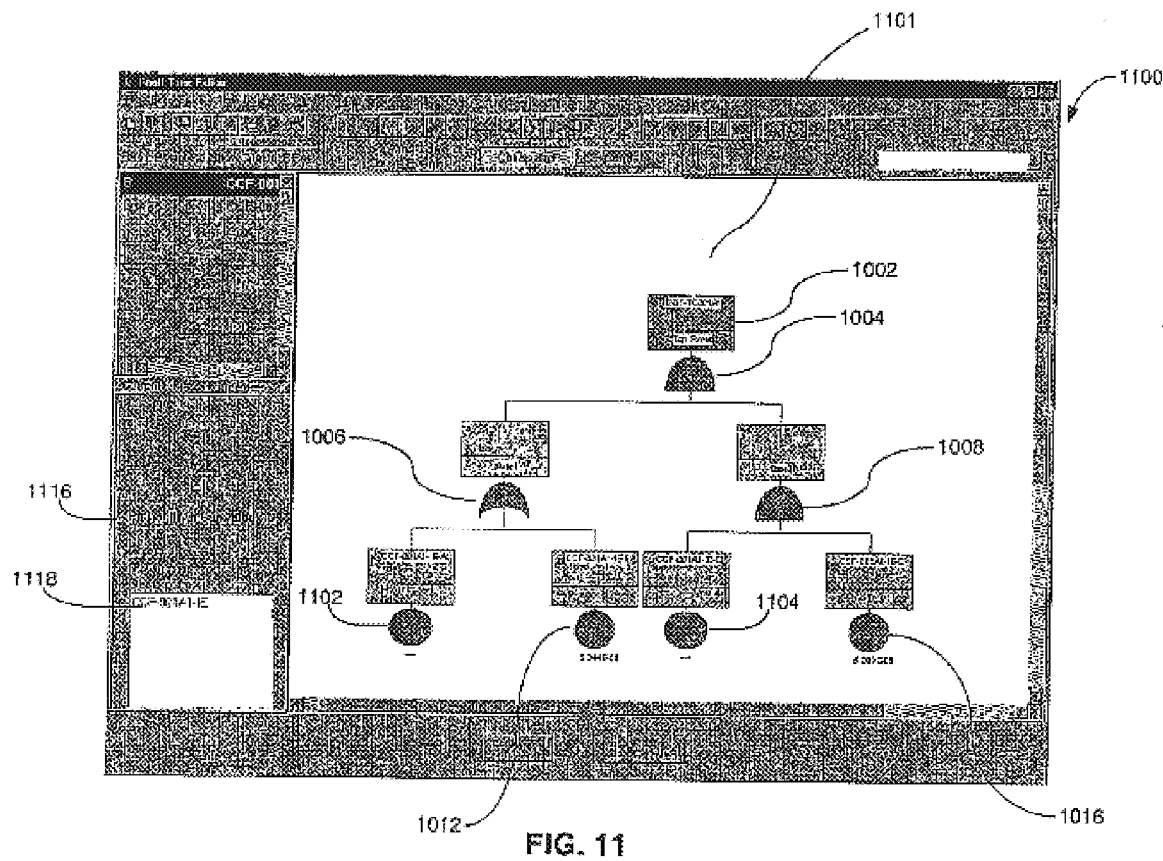
FIG. 11 is a graphical representation of the fault tree shown in FIG. 10 expanded to show common-cause basic events.

FIG. 10 presents an exemplary screen 1000 showing the fault tree and indicating of the logical relationships shared between the associated basic events. In FIG. 10, an exemplary screenshot 1000 shows a fault tree 1001 including a top event 1002, a logic gate 1004, a logic gate 1006 and a logic gate 1008. Also shown is a list of exemplary basic events 1010, 1012, 1014, and 1016. As represented in the fault tree, the logic gate 1006, here chosen as a logical OR gate, connects the basic events 1010 and 1012. The logic gate 1008 is a logical AND gate and logically connects the basic events 1014 and 1016. The screenshot 1000 is presented as a view of the fault tree before application of the expansion rules to be applied by the rule expansion module 310 shown in FIG. 3. After application of all of the expansion rules, the common cause dependencies can now be properly introduced into the fault tree structure. FIG. 11 illustrates this introduction.

FIG. 11 presents an exemplary screen view 1100 showing an expanded version of the fault tree 1001. It will be noted that in the fault tree 1101 shown in FIG. 11, the basic event 1010 which was shown in FIG. 10 as an independent event is now graphically indicated to have been expanded according to the logic of the common cause group 1102. Similarly, the basic event 1014 as shown in association with basic event C is now shown to be a member of a common cause group, and has therefore been expanded 1104.

Thus, common cause group 1104 illustrates that one basic event can exist as a regular basic event 1014 and a common cause basic event 1114, which represent the potential for an independent failure or a dependent failure attributed to the same event. The basic events 1012 and 1016 remain unchanged in this particular fault tree structure, since they do not belong to a common cause group. As noted in FIG. 11, the common cause groups 1102 and 1104 are represented by a double circle configuration. Also noted in FIG. 11, a probability mean value 1116 associated with the occurrence of the common cause group 1102 can also be indicated as shown in window 1118. Any other data determined desirable by the analyst, can be similarly displayed. Since the double circle configuration can be difficult to view, the risk analyst is provided with an extended expansion tool to graphically distinguish between the common cause basic events and the regular basic events.

Figure 12:
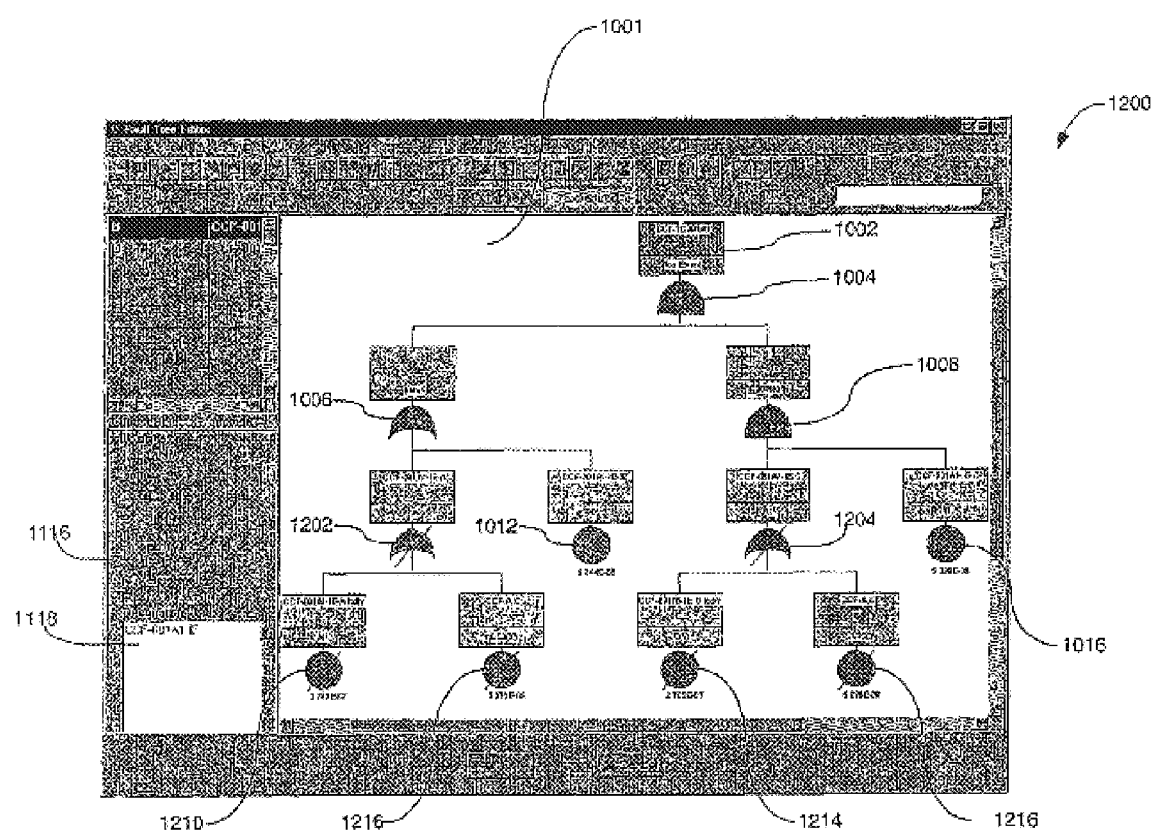
FIG. 12 is an exemplary graphical representation of the fault tree shown in FIG. 11 using logic gates to replace the common-cause basic events.

FIG. 12 presents an extended expansion view showing the expansion of regular basic events 1010 and 1014 into common cause basic events 1210 and 1214, and 1216, common cause basic event 1216 being common to the expansion of basic event 1010 as well as basic event 1014. FIG. 12 also shows the automatic replacement of the basic events by a logical operation showing the common cause basic events associated with the common cause group. As shown in FIG. 12 the common cause basic event 1102, previously shown in FIG. 11, has been replaced with a logical OR gate 1202 to more clearly illustrate the relationship between the basic events and the top event in the fault trees, and to provide more detail about the exact nature of the expansion of basic events.

In FIG. 11 the top event 1002 is shown to occur if the common cause basic event 1102 occurs or basic event 1012 occurs in combination with an occurrence of the common cause basic event 1104 and an occurrence of the regular basic event 1016.

In FIG. 12 however, it can be seen that the common cause basic event 1102 has been replaced with an OR gate 1202 indicating that the basic event that formed the common cause group 1102 can exist as the independent event 1210 or as the common cause basic event 1216. This means that one basic event can contribute to a failure as an independent event or as a dependent event, each having its own probability of occurrence.

Similarly, the common cause basic event 1104 shown in FIG. 11 is replaced with the OR gate 1204 shown in FIG. 12, indicating that the basic event that formed the common cause group 1104 can create a failure as regular independent basic event 1214 or as the common cause dependent basic event 1216. Event 1216 is common to the expansion of group 1102 and 1102, introducing the dependence between the events into the risk model.

Such an expanded fault tree visualization, as discussed in relation to the present invention, aids the risk analysis in quickly and efficiently determining which basic events are most likely to contribute to a system failure after reprioritizing pivotal events within an events sequence diagram.

Thus, the present invention provides a common-cause failure module that is aware of the rules for constructing and quantifying common-cause failure groups and common cause basic events. The present invention is therefore capable of assisting the risk analyst in introducing common-cause dependencies into the risk model and assessing their impact on system failures.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A computer readable medium carrying one or more sequences of one or more instructions for execution by one or more processors, the instructions when executed by the one or more processors, cause the one or more processors to perform the steps of:

automatically inserting common cause basic events into multiple fault tree structures in a risk model stored in a computer memory; and replacing regular basic events within the multiple structures with logic gates including two or more common cause basic events associated with the common cause failure group, the logic gates being based upon a single definition of a common cause failure group.

2. The computer readable medium of claim 1 carrying the one or more instructions, further causing the one or more processors to correctly sample probabilities associated with the common cause basic events when an uncertainty analysis is performed on the risk model;

wherein dependencies in the common cause basic events are accounted for and reflected in the risk model.

3. A computer readable medium carrying one or more sequences of one or more instructions for execution by one or more processors, the instructions for verifying a common cause failure model stored on a computer memory, the model including common cause basic events being automatically inserted into multiple fault tree structures, the instructions using one or more graphical user interfaces configured to display at least the event sequence diagram and the regular basic events, the instructions when executed by the one or more processors, cause the one or more processors to enable a user to perform the steps of:

forming a list including a number of common cause group member events, each corresponding to at least one regular basic event;

selecting a number of rules to apply to the common cause group member events of the list;

defining common cause groups based upon application of the rules, the common cause groups being formed of the common cause basic events; and introducing risks into the common cause failure model in accordance with the common cause groups.

4. A method for enabling a user to identify common cause failure groups within a software based risk model, the risk model including common cause basic events being automatically inserted into multiple fault tree structures, and being stored on a machine readable computer medium, the method comprising the steps of:

permitting a user to display a list of existing common cause failure groups associated with the risk model via a graphical user interface; and permitting the user to modify the list using the graphical user interface.

5. The method of claim 4, further comprising a step of filtering to permit the user to display only selected common cause failure groups from within the existing common cause failure groups.

6. The method of claim 4, wherein each common cause failure group is associated with an event sequence diagram which schematically represents a sequence of events leading to a failure.

7. The method of claim 4, wherein the step of permitting the user to modify the list includes at least one of a sub-step of one of permitting the user to edit one or more of the existing common cause failure groups and creating one or more new common cause failure groups.

8. The method of claim 7, wherein the step of creating new common cause failure groups includes:

displaying a global list of regular basic events via the graphical user interface; and permitting the user to create each of the one or more common cause failure groups by selecting group member events from the global list of regular basic events to form a member list of common cause basic events, the common cause group member events forming the common cause failure group.

9. The method of claim 8, further comprising the steps of:

displaying the common cause failure groups to the user via the graphical user interface;

providing a list of rules to expand the common cause failure groups via the graphical user interface; and permitting the user to select a particular rule from the list to apply to the common cause failure groups for expansion into common cause basic events.

10. The method of claim 9, further comprising the steps of:

facilitating a customized expansion of the common cause failure groups based upon the particular rule; and permitting the user to graphically display a preview of the customized expansion.

11. The method of claim 10, wherein the customized expansion includes a display of selected ones of the common cause groups.

12. The method of claim 10, wherein the common cause groups are associated with one or more fault trees, and wherein the preview includes a display of the one or more of the fault trees.

13. A method for permitting a user to determine a probability of occurrence of a common cause group within a system risk model, the model including interdependent event sequence diagrams and being stored on a machine readable computer medium, the method comprising user initiated steps of:

graphically displaying a list of one or more models adapted for application to the common cause group;

wherein the user specifies parameters associated with a selected one of the one or more models; and wherein the specified parameters are used by the models to expand the common cause group into a number of common cause basic events; and automatically inserting the common cause basic events into multiple fault tree structures.

14. The method of claim 13, wherein the one or more models include at least one of an Alpha Factor and a Beta Factor model.

15. The method of claim 14, wherein each of the models requires an input of a number of model parameter values; and wherein the user determines the values.

16. The method of claim 14, further comprising a step of determining a probability that the common cause basic event will represent an independent failure and the probability that the common cause basic event will represent a dependent failure.

17. The method of claim 13, wherein the probability uncertainty values are associated with a total probability of occurrence of the common cause group.

18. The method of claim 13, wherein the common cause group is associated with a fault tree related to the selected event sequence diagram, the fault tree (i) being a graphical representation of inter-related combinations of regular basic events and common cause events and (ii) having a top event produced by an occurrence of the inter-related combinations, the method further comprising a step of determining a minimum number of occurrences of the inter-related combinations that produce the top event.

19. The method of claim 18, further comprising a step of determining the probability of occurrence of the top event.

20. The method of claim 19, wherein the steps of determining the probability of occurrence of the top event are based upon a Monte Carlo sampling scheme.

21. A method of expanding a fault tree in a risk model, the risk model including common cause basic events being automatically inserted into multiple fault tree structures, wherein the risk model is implemented in software stored on a computer memory, the method comprising the software implemented steps of:

identifying an event sequence diagram associated with the fault tree;

retrieving all common cause groups related to the event sequence diagram from the memory, each common cause group including a number of common cause basic events;

determining whether the regular basic events are associated with any of the common cause groups; and replacing each of the determined regular basic events in the fault tree structure with a logical operation, the logical operation having attached thereto two or more corresponding common cause basic event from within the number of common cause basic events.

22. The method of claim 21, wherein the logic operations are represented by at least an OR gate and an AND gate.

23. The method of claim 21, wherein the steps of retrieving, determining, and replacing are performed in accordance with one of a number of expansion models.

24. A system including a processor and memory, comprising:

a first database stored in the memory and including a system risk model, the risk model including (i) at least one event system diagram and (ii) a number of fault tree definitions corresponding to the event system diagram, the fault tree definitions adapted to model an influence of system component failures upon the system, each fault tree relationship being formed of a number of inter-related regular basic events;

a common cause group defining mechanism configured to permit a user to define common cause group in accordance with the number of inter-related basic events, the common cause group defining mechanism including one or more graphical user interfaces to configured to (i) display defined common cause groups and (ii) permit the user to load the defined common cause groups into the first database, the common cause groups being defined in terms of common cause basic events, each corresponding to a regular basic event;

a fault tree data structure mechanism configured to define a fault tree data structure, the fault tree data structure being stored in the memory and adapted to convey an interdependence between the stored fault tree definitions to form multiple fault trees;

a common cause failure expansion mechanism configured to apply common cause failure expansion rules, the rules being stored in the memory and adapted to convey a union of the regular basic events and the common cause basic events;

wherein the processor is configured to apply the common cause failure expansion rules to the multiple fault trees, the common cause basic events being automatically inserted into the multiple fault trees; and wherein the expanded data structure is displayed to the user via the one or more graphical user interfaces.

25. The system of claim 24, further comprising a probability determining mechanism configured to determine a total probability of a common cause group and a probability of occurrence of the common cause basic events.

26. The system of claim 24, further comprising at least one graphical user interface configured to permit the user to control operation of the system.

* * * * *

UNITED STATES PATENT AND TRADEMARK OFFICE
CERTIFICATE OF CORRECTION

PATENT NO. : 6,820,044 B2  Page 1 of 1
APPLICATION NO. : 09/971765
DATED : November 16, 2004
INVENTOR(S) : Franciscus J. Groen It is certified that error appears in the above-identified patent and that said Letters Patent is hereby corrected as shown below:

On the title page item (75), -- add Swaminathan Sankaran as the fourth inventor on the issued patent --.

Signed and Sealed this

Sixteenth Day of October, 2007

JON W. DUDAS
*Director of the United States Patent and Trademark Office*